F. N. LOWRY.
METER.
APPLICATION FILED SEPT. 10, 1906.
1,160,735.
Patented Nov. 16, 1915.
2 SHEETS—SHEET 1.
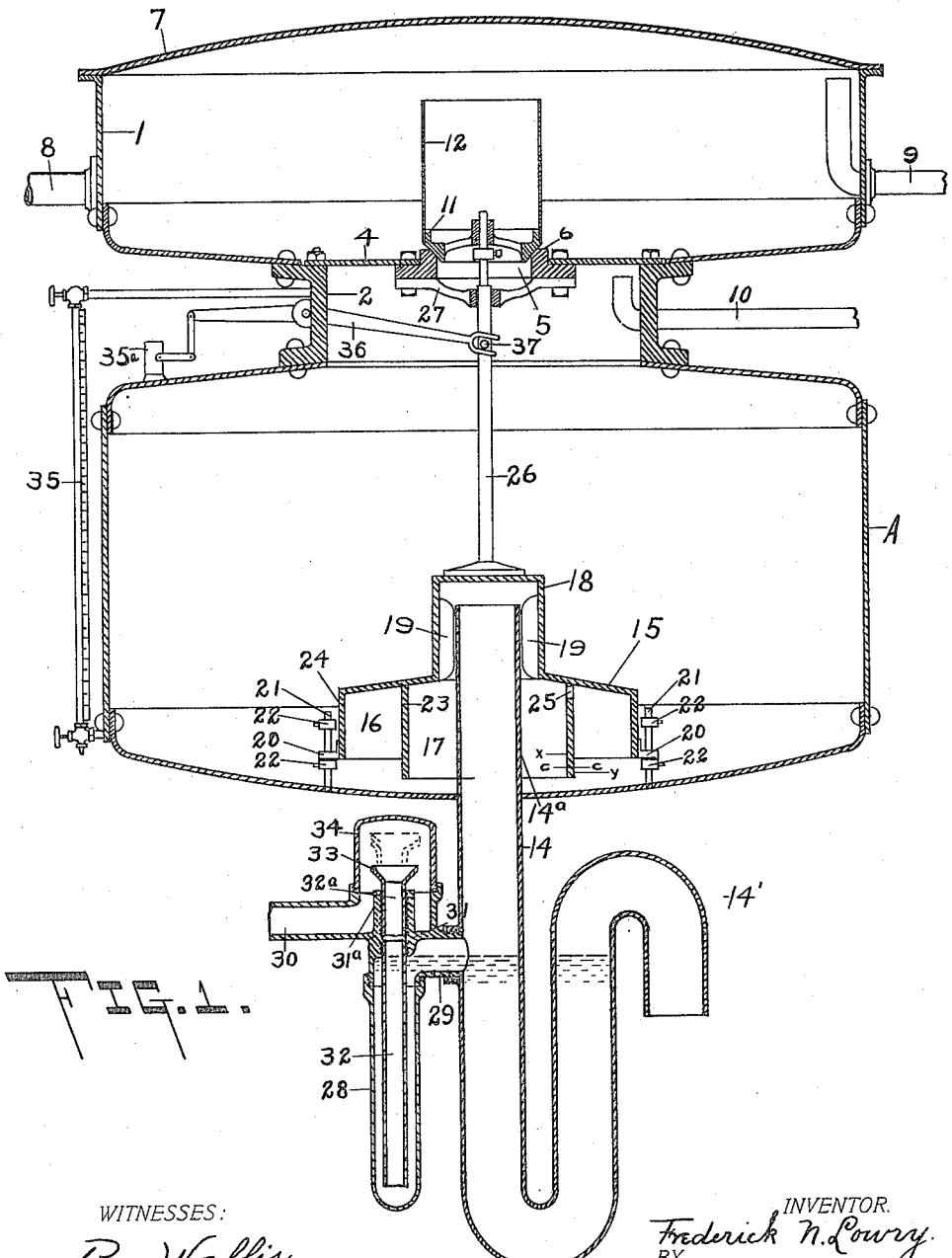
WITNESSES:
Roy Wallis.
L. H. Marshall.
INVENTOR.
Frederick N. Lowry.
BY
Geo B Willcox
ATTORNEY.

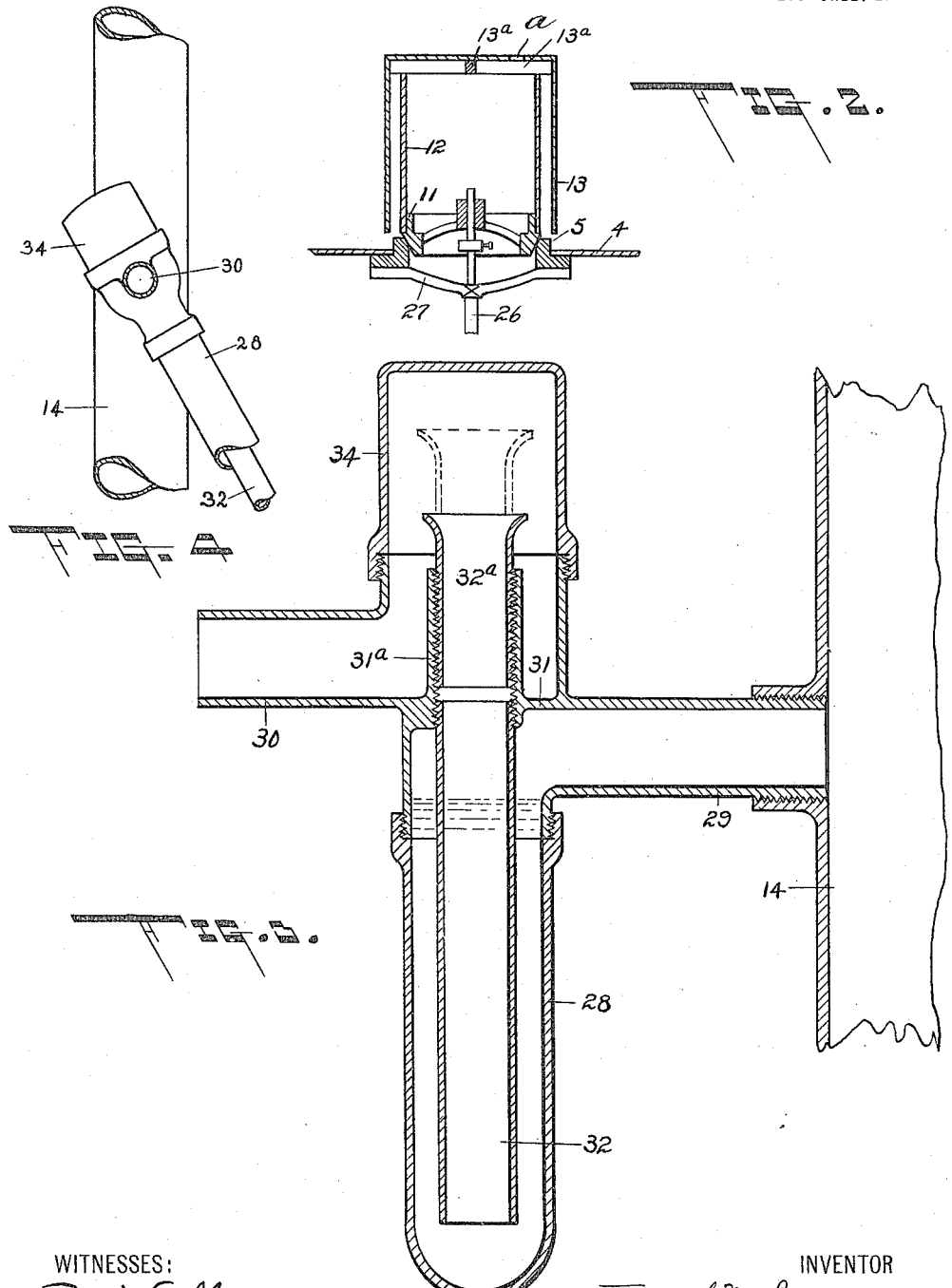

UNITED STATES PATENT OFFICE.

FREDERICK N. LOWRY, OF MIDLAND, MICHIGAN, ASSIGNOR TO GEORGE B. WILLCOX, OF SAGINAW, MICHIGAN.

METER.

1,160,735.        Specification of Letters Patent.        Patented Nov. 16, 1915.

Application filed September 10, 1906. Serial No. 334,057.

*To all whom it may concern:*

Be it known that I, FREDERICK N. LOWRY, a citizen of the United States, residing at Midland, in the county of Midland and State of Michigan, have invented certain new and useful Improvements in Meters; and I do hereby declare the following to be a full, clear, and exact description of the invention.

My invention relates to meters, and more particularly to that class of meters adapted to measure liquids supplied to the meter, either continuously or intermittently.

One object of my invention is the provision of a measuring receptacle so formed or constructed as to occupy a comparatively small vertical space, whereby a compact and efficient device is produced.

Another object of my invention is the provision of a supply connected to the meter in such a manner that the head of liquid in the supply necessary to cause the liquid to enter the meter is materially reduced.

A further object of my invention is the provision of an automatic tripping pipe or member of novel design and most effective operation.

A still further object is the combination of a stand pipe and valve whereby the resistance of the liquid to the raising of the valve is almost completely overcome.

A further object is the provision of means for maintaining a predetermined level of liquid in the bell prior to the entrance into the measuring tank of the liquid to be measured.

Another object is the provision of novel means for permitting the equalization of the liquid in both chambers of the bell.

A further object is the provision of means for preventing the entrance of steam or highly rarefied gas into the measuring receptacle.

A still further object is the provision of separate means for supplying the reservoir and receptacle with air and permitting its escape therefrom.

Another object is the provision of a tripping mechanism adapted to reduce the force of the head of liquid issuing therefrom and maintain a column of liquid of an almost constant height therein.

To these ends, therefore, my invention consists in certain novel features, and combinations of parts or their equivalents, such as will be more fully described hereinafter and particularly pointed out in the claims.

In the accompanying drawings, Figure 1 discloses a vertical cross-sectional view through a meter, illustrating one embodiment of my invention, Fig. 2 is a detail view showing the steam trap in position, Fig. 3 is an enlarged detail view in section of the tripping siphon, and Fig. 4 is a side view of the tripping member adjusted to an inclined position.

The meter as an entirety comprising a measuring tank or compartment (A) which may be of greater diameter than height, and a reservoir (1) which reservoir may be of less height than the tank or compartment (A), but may be of equal diameter, and is connected therewith by means of a contracted waist (2) which forms a part of the compartment (A).

It is, of course, obvious that my invention is not limited to a meter of the foregoing form and may be constructed of any desired size, shape or conformation, but by means of such construction I am enabled to obtain a reservoir and measuring compartment of maximum area with a minimum of height, since ofttimes the space available is not sufficient to permit the installation of a meter of considerable vertical height. The contracted waist serves the purpose of causing an acceleration of the head of liquid in the measuring tank, as will be hereinafter more fully set forth.

The reservoir is divided from the tank by means of a partition (4) located just above the waist (2), the partition having a valve aperture (5) in which is preferably located a raised valve seat (6) adapted to receive the valve hereinafter mentioned, the bottom of the reservoir sloping toward the aperture (5). A removable cover (7) may be conveniently superposed upon the reservoir to prevent the entrance of extraneous matter into the reservoir and the escape of gases into the room where the meter is located. A supply pipe (8) leads into the reservoir at its lower end as shown, thereby materially reducing the head of liquid necessary to be attained to cause it to flow into the reservoir. Heretofore, the supply pipe has been led into the reservoir through the top or upper end, but I deem the present arrangement more desirable for the reason set forth and also because it permits the removal of the cover for the purpose of cleaning and inspecting without disconnecting the supply.

In order to furnish the reservoir with an adequate air supply, a vent (9) leads into it. its inner end being upturned and extending to a point near the cover to prevent the entrance of liquid thereinto. A similar vent pipe (10) leads into the measuring compartment, preferably at the waist (2), these vents preventing the occurrence of a vacuum in the respective receptacles, as will be understood hereinafter.

One portion of my invention relates to means for intermittently retaining a head of liquid in the reservoir, and as one means for accomplishing this result, I have shown a combined stand pipe and valve. Received on the valve seat (6) is a skeleton valve (11) comprising a circular grid to which is secured a cylindrical stand pipe (12) inclosing the valve and extending preferably vertically thereabove. It will be seen that hitherto the stand pipe and valve have been located apart from each other and in prior constructions the rise of liquid in the measuring compartment is adapted to cause the operation of means for raising the valve from its seat to permit the accumulated liquid in the reservoir to flow rapidly into the compartment. Naturally, the force necessary to raise the valve in former constructions must be such as to overcome the weight of liquid in the reservoir bearing upon the valve added to the weight of the valve. In the present construction, by combining the stand pipe and valve, this weight of liquid is obviated and it is only necessary to overcome the weight of the valve itself plus the skin friction of the liquid against the outer periphery of the stand pipe.

As the charge in the measuring compartment A is delivered through the discharge pipe 14, it will naturally create a vacuum in the measuring compartment which, if not relieved, would prevent the full discharge of the quantity of water measured. The provision of the vent pipe 10 leading into the measuring compartment prevents the occurrence of a vacuum therein. Now in measuring heated liquid for instance, it is desirable that the steam or gases in the receiving chamber 1 be prevented from being drawn into the measuring compartment A. If they were drawn in to any appreciable extent by the vacuum which the discharging liquid tends to create, they might vitiate the air therein, and entering the bell float 15, cause the float to lose its buoyancy thereby preventing an accurate operation of the machine. To prevent this possible disadvantage, I may provide a trap 13 as shown in Fig. 2, the trap comprising an inverted cup closed at its upper end, with the exception of a small pin hole $a$, to permit air entrained in the stand pipe and trap to escape, and open at its lower end, the trap being of larger diameter than the stand pipe and fitting thereover, the lower edge of the trap extending to a point adjacent the partition 4. The upper end of the trap may normally lie above the liquid level in the reservoir 1, thus avoiding the imposition of weight on the trap and the valve which would have to be overcome by the pressure of air entrained in the bell float as hereinafter set forth.

The air entrained within the stand pipe and trap is caught as follows: As the liquid rises in the reservoir, it will stand at the same level within and without the trap. Finally the liquid level reaches the upper end of the stand pipe and pours down into the measuring compartment A raising the liquid level therein until the liquid rises to the full height of the waist 2, submerging the inner end of the vent pipe 10. As soon as such vent pipe opening is submerged the air is compressed and would tend to raise the stand pipe were it not for the pin hole exhaust $a$. The level of liquid is allowed to rise into the stand pipe 12 submerging the valve 11 before the charge is tripped. By so doing a variation in height or head is of little or no importance owing to the small cross-sectional area of the stand pipe, whereas a similar variation in the head in the measuring compartment A would amount to a considerable volume added to or deducted from the normal unit charge, owing to the great cross sectional area of the measuring compartment A. The closed end of the trap is provided interiorly with the crossed strips (13$^a$) resting upon the upper open end of the stand pipe and permitting access of liquid to the stand pipe, a free passage being formed between the inner periphery of the trap and the outer periphery of the stand pipe, and between the lower edge of the trap and the bottom of the reservoir.

The operation of so much of the machine as is herein before described is as follows: A liquid,—as hot water,—is delivered through supply pipe (8) to the reservoir and quickly seals the bottom of the trap, thereby preventing any steam from entering the passage between the stand pipe and trap. When the water in the reservoir has attained the level of the upper end of the stand pipe, (the level of the water being equal in the reservoir and in the annular passage between the trap and stand pipe, owing to the fact that any air caught in the passage is forced down the stand pipe and through the valve into the measuring compartment and through the vent ($a$) it will pour over into the stand pipe and through the valve into the measuring compartment. the air or steam in the reservoir being forced out of the vent (9) as the reservoir fills with liquid. When the valve is opened to permit the accumulated water in the reservoir to flow into the compartment, the steam entering the compartment is forced out of the vent (10) or back through the valve aperture, as the level of water in the compartment rises. When the valve is reseated, the inflow of the liquid from the supply pipe (8), quickly raises the level of the liquid in the reservoir above the lower edge of the trap to seal the latter against the entrance of steam into the measuring compartment, as it is being emptied of its charge.

The trap is removable from the stand pipe and merely rests thereon. Of course it must be understood that this embodiment of my invention is not limited to its use with heated liquids, but is adapted for use with cool liquids, and when so used, the trap is not essential.

Extending upward through the bottom of the measuring compartment and for some distance thereinto, is the induction or receiving arm of a liquid-sealed discharge pipe (14), the joint where it passes into the measuring compartment being tight. The upper end of this arm of the discharge pipe is open, and although I have shown this pipe as approximately U-shaped, it is evident that it may be of any approved type so long as it contains means for sealing it against the escape of air from the compartment (A), such means in the present instance being liquid. The eduction end (14') of the pipe (14) may be bent downwardly as shown, for convenience and preferably does not extend above the level of the bottom of the compartment.

The liquid with which the discharge pipe (14) is sealed will, of course, lie at the same level in both arms of the pipe, which level is determined by the height of the open end of the eduction arm, relative to the induction or receiving arm, and when such open end is located beneath the bottom of the measuring receptacle, as in the embodiment of my invention herein described, it is obvious that the upper end of the longer receiving arm of the discharge pipe, above the level of the liquid therein, will be filled with air.

The inner open end of the receiving arm of the discharge pipe is inclosed by and received within a bell or float (15) and it is in reference to this bell wherein another novel feature exists. Hitherto it has been found that the bell did not receive as much air as was desirable, and in some cases, the air within the bell became rarefied or of a density less than the air in the compartment, wherefore the compression of air within the bell did not create sufficient energy to operate the bell at the proper time, but was delayed until the level of the liquid had ascended some distance within the bell. This was particularly noticeable when heated liquids were being measured, the steam or vapor from which would drive off the air and were themselves either so low in specific gravity or density, or subject to condensation so as to prevent a sufficient compression and permit a premature discharge of the contents of the compartment. It is obvious that as the water is discharged through the discharge pipe 14 it will draw with it and entrain air from the bell 15. Now assuming that there is no means for resupplying the bell with fresh air at atmospheric pressure, it is plain that when the siphon breaks the cylindrical column of water in chamber 17 will tend by gravity to fall toward the bottom of the measuring tank, but owing to the vacuum created within the upper end of the discharge pipe and in the inner chamber 17 assisted by the atmospheric pressure on the water outside chamber 17, the cylindrical column of water in chamber 17 would not be permitted to equalize with the level of water outside the chamber. It has been found also that the level of water inside chamber 17 under these conditions varies which fact in addition to the low density of the air within the chamber 17 would prevent the proper operation of the float, it being necessary that the float be forced upward, owing to the compression of air thereunder by the rising liquid in the measuring compartment before such rising liquid level attains a height within the bell sufficient to permit it to enter the discharge pipe. In experiments, it was found that unless the bell was supplied with fresh air after each discharge and the liquid level equalized, the water would sometimes enter the discharge pipe and start to siphon without raising the bell at all, or would overcome the slight buoyancy caused by the compression of the rarefied air or light gases within the bell and start a discharge before the compartment had received its full unit charge. To obviate these disadvantages, I provide a means for causing the entrance of a sufficient quantity of air into the bell and also provide a means for causing the level of liquid within and without the bell to equalize prior to the compression of air in the bell, whereby the compression will uniformly commence only when the liquid has reached a predetermined level. To these ends I have provided a bell (15) having two annular concentric chambers (16) and (17), the wall (23) of the inner chamber (17) depending below the wall (24) of the outer chamber and said inner chamber being provided with an upward closed extension (18) surrounding and inclosing the upper open end of the discharge pipe, guides (19) (19) being preferably carried by the extension and engaging the periphery of the discharge pipe. The outer shorter wall (24) of the bell may be provided with perforated ears (20) (20), through the perforations in which extend pins (21) (21), the pins carrying stops (22) (22) thereon between which stops the ears are movable, the stops limiting the upward and downward movement of the bell, the longer wall (23) of which is never permitted to engage the bottom of the compartment, and I preferably form an aperture (25) in wall (23) near its upper end to admit of a communication of air between chambers (16) and (17). The chambers (16) and (17) and the upper end of the discharge pipe together constitute an air chamber within which the air is compressed.

As the liquid from the reservoir pours over the stand pipe at the first operation of the device into the measuring compartment, the bell being in its lowest position, the liquid will seal the inner longer wall (23) and will tend to compress the air in the air chamber formed by the bell and the upper end of the discharge pipe, the latter being liquid sealed, but such air is permitted to escape through the aperture (25) into the outer chamber (16) and beneath the outer wall (24) until the level of the liquid in the measuring compartment reaches the lower edge of the outer wall (24), at which time the compression of air in both inner and outer compartments will take place simultaneously, the level of the liquid in the inner compartment (17) being even with the lower edge of the outer wall (24). Of course, as the height of liquid in the compartment increases, the air in the outer chamber (16) will be forced into the inner chamber (17) through the aperture (25). Upon the interruption of the siphoning action, the levels of the liquid in the inner and outer chambers of the bell, are indicated by the lines $x$ and $y$ respectively, which levels will equalize at the point $c$—$c$, by reason of the aperture (25), air freely entering chamber (16) beneath wall (24), and thence supplying the air space inclosed by the wall (23) through the aperture (25), thus avoiding a rarefaction of air in the main air space.

To the upper end or extension (18) of the bell is secured a rod (26) which extends upwardly through a spider (27), or other suitable guide secured to the lower face of partition (4), and engages the valve (11). I prefer to connect rod (26) slidingly with the valve in the manner shown, in order to admit of the valve being easily removed and replaced. Thus, when the float or bell is raised, the rod (26) will raise the valve (11) and permit the liquid accumulated in the reservoir to quickly discharge into the measuring compartment, and when the bell sinks the valve will fall back onto its seat by its own weight, being guided in its movement by the protruding end of the rod.

For effecting a discharge of the contents of the measuring receptacle when the latter has received its full charge, I have found it desirable to employ an automatic means for permitting the escape of the air confined in the chamber (17) and pipe (14) when the liquid in the compartment has reached the desired altitude, the means becoming operative at that time and as one such means for accomplishing this purpose, I provide a tripping mechanism which preferably, though not necessarily, is connected with the induction arm ($14^a$) of the discharge pipe at a point above the liquid level therein. This tripping mechanism may, however, communicate with the air space formed by the chamber (17) of the bell and the upper end of the induction arm of the discharge pipe at any point.

The tripping mechanism may be of any convenient form, but I prefer in this particular embodiment of my invention to employ a specially formed device which is so constructed as to possess advantages not attained by an ordinary U-shaped pipe to which end I provide a hollow approximately T-shaped casing comprising a stem (28) and oppositely extending branches (29) and (30). The open end of the branch (29) is connected to the discharge pipe (14) at a point above the liquid level thereof, the stem of the casing preferably being of less area or diameter and of less length than the discharge pipe.

The branch (30) is isolated from the intercommunicating branch (29) and stem (28) by a plate (31) preferably carrying a threaded sleeve ($31^a$) adapted to receive and support a sectional open-ended air escape pipe (32). This pipe is preferably straight and depends into the stem (28) nearly to the bottom thereof. The upper section ($32^a$) of the escape pipe is flared as at (33), and communicates with the branch (30) which is unobstructed at its outer end. The stem is adapted to contain liquid to a point level with the branch (29) as shown, whereby to temporarily seal the lower end of escape pipe (32) against the access of air thereto.

The air escape pipe (32) is preferably of considerably smaller diameter than the casing so that the air in the air space has free access to the level of the liquid seal and after forcing the liquid out of the casing through the air escape pipe, as will be hereinafter fully set forth, the air is permitted a large free passage to the lower end of the pipe (32) and from the upper end of the adjustable section ($32^a$) to the atmosphere. The object in squaring the lower end of pipe (32) is to permit the air, after having forced the water in the stem down to the level of the lower end of the pipe (32), to quickly make the turn and pass up into the pipe (32). This is of considerable benefit since when a large supply is pouring into the measuring compartment, the short time occupied by the air in traveling around the bend in a U-shaped pipe, permits the entrance to the measuring chamber of some liquid after the liquid in the measuring compartment has attained the desired height, thus impairing the accuracy of the machine.

Having thus described the embodiment of my invention, I will set forth its operation.

The bell or float being in its lowered position and the valve (11) on its seat, liquid is admitted to the reservoir (1) and accumulates therein until it attains the height of the stand pipe, the air in the reservoir being forced out of the vent (9) or through the valve grating into the compartment (A). The liquid then pours over the edge of the stand pipe and through the valve into the measuring compartment, where it again accumulates, first sealing the inner chamber (17) and then the outer chamber (16), the air pressure equalizing itself through the aperture (25) as heretofore explained. As the liquid increases in depth it compresses the air in the main air space inclosed by chamber (17), extension (18) and the induction arm of the discharge pipe (14), the discharge pipe (14) and the stem (28) of the tripping mechanism each containing a liquid seal as shown. The air in the chamber (16) is also compressed, uniting with the air in the main air space to impart buoyancy to the float. When such liquid in the measuring compartment has reached such a depth that the amount of liquid displaced by the float weighs more than valve (11) and the float, the latter will rise to its upward limit of movement, thereby causing the rod (26) to raise the valve (11) and release the liquid accumulated in the reservoir through valve aperture (5), whereupon the measuring compartment is quickly filled. Now, owing to the increasing height of liquid therein, the air in both chambers (16) and (17) is greatly compressed, and owing to the resistance opposed by the air, the liquid does not rise rapidly in either chamber. Hence, as the head of liquid rapidly increases in the measuring compartment, it will more gradually rise within the two chambers, such gradual rise of the liquid operating through the entrained air column against the column of liquid in the induction arm of the discharge pipe (14) and against the column of liquid in the stem (28) of the tripping mechanism, depressing both columns equally.

In view of the fact that there is a less head of liquid in the escape pipe (32) and (32a) than in the discharge pipe (14), the liquid will be forced out of the air escape pipe (32) before the level of the liquid reaches the lower end of the discharge pipe, thus permitting the air entrained in the air space to escape. The upper end of the adjustable section (32a) is flared to permit the force of the column of water to diminish and prevent a fountain effect, which would increase the head of liquid and require a greater pressure of air to discharge the liquid in the escape pipe. The liquid level in the stem (28) is gradually lowered, as the head of the liquid in the measuring compartment increases, until it is even with the lower end of the air escape pipe (32). The level of the liquid in the measuring compartment having now reached the predetermined level or dumping point the compressed air in the pipe (28) enters the pipe (32) and suddenly blows out the liquid still remaining in the pipe (32), thus breaking the liquid seal and permitting the air in the bell and receiving end of the discharge pipe to quickly escape.

As soon as the liquid seal is broken, the weight of the liquid in the measuring compartment bearing upon the bell causes the latter to sink immediately to its lowest position, and the liquid within the bell which has nearly reached the upper end of the induction arm of the discharge pipe is reinforced by other liquid which now pours in without opposition to completely fill chamber (17) of the bell, whereupon a siphoning action is established, the liquid pouring down through the discharge pipe and out of the eduction end thereof, such siphoning action continuing until the level of the liquid in the measuring compartment descends to the lower edge of the wall (23), the aperture (25) being too small to effect a breaking of the siphon.

As soon as the level of liquid in the compartment in discharging reaches the lower edge of the outer wall (24), air from the compartment enters the outer chamber. The siphon breaks only when the liquid level reaches the lower edge of the longer wall (23), whereupon the air enters the space inclosed by the inner chamber (17), the extension (18), and the upper end of the discharge pipe. During the discharge of the contents of the measuring compartment, a portion of the liquid may also find its way out of the branch (30) of the tripping mechanism, but not in any great quantity, and if it is desired to save such liquid, the branch (30) may be caused to deposit the liquid in the same receptacle into which the discharge pipe delivers. When the siphon breaks, the liquid within the chambers (16) and (17) will equalize at about the line $c—c$, and the sealing liquid will be left in the stem and discharge pipe. As heretofore stated, the compression of the air will always commence when the level of the liquid rises to a point even with the lower edge of the outer wall (24).

In making tanks for existing conditions, it is sometimes necessary to make them large in diameter and low in height. The preferable form of construction is shown in Fig. 1, in which the contracted waist (2) forms the upper part of the measuring compartment. The object of the contracted waist is to increase the accuracy of the apparatus; that is, to reduce to the minimum the error which will exist if the predetermined level at which the discharge occurs is not constant. It will be readily seen that if there is any variation in the predetermined level at which the discharge occurs, the greater per cent. of error will be when this predetermined level is within the compartment (A) where the diameter is large, and that the less per cent. of error will be when this level is within the contracted waist (2), where the diameter is small.

When the level reaches the contracted neck or waist its rate of rise is suddenly increased just previous to the discharge. This sudden rise of level in the neck results in the quick starting or priming of the siphon discharge pipe and simultaneously brings about the sudden shutting off of the supply of liquid to the measuring compartment, this being accomplished by the vertical movement of the float.

The coöperation of the contracted neck or waist with the siphon discharge and float-actuated means for shutting off the in-flowing supply are important features of my invention, for by such coöperation the accuracy of the machine under varying rates of supply is increased and its functions are performed more positively and quickly.

Of course, the moment the bell sinks, the valve (11) is reseated, thus preventing the further access of liquid to the compartment and compelling it to accumulate in the reservoir until the liquid in the compartment has been all discharged, at which time the compartment is ready to receive the liquid pouring over the upper edge of the stand pipe, and the operation just described is repeated. Obviously, the reservoir, the compartment and the discharge pipe must be so proportioned as to accomplish this. When the valve (11) is opened, the discharge of liquid into the compartment would tend to create a vacuum in the reservoir were it not for the vent (9) and similarly the discharge of water from the measuring compartment might create a partial vacuum in the compartment were it not for the vent pipe (10), though, of course, air does have access to the compartment from the reservoir through the stand pipe and skeleton valve.

It is frequently desirable to vary the amount of volume of the charge delivered by the compartment, so that varying quantities of the same liquid or the same quantities of different liquids can be accurately measured. Thus, if a liquid of one specific gravity is being measured, and it is desired to measure the same weight of a liquid having a different specific gravity, the apparatus may be so arranged as to effect this result by adjusting the tripping mechanism, and as one means for accomplishing these results, I preferably adjustably connect the upper section ($32^a$) of the escape pipe to the sleeve ($31^a$) as by means of threads. By rotating the upper section, the air escape conduit is lengthened to increase the head of liquid, and consequently cause the compartment to accumulate a large quantity of liquid before the compression of the air in the air space will be sufficient to blow the liquid out of the air escape pipe. Vice versa, by rotating the upper section in the opposite direction, the air escape conduit or tripping pipe is shortened so that a lower level of liquid in the measuring compartment will effect the discharge of the reduced head of liquid in the conduit, or tripping pipe.

As another means for varying the volume of the charge delivered by the measuring compartment, I provide a movable joint between the tripping mechanism and the discharge pipe, as illustrated in Fig. 4. When the tripping mechanism is in a vertical position, the maximum unit charge will be delivered, and by swinging the tripping mechanism out of a vertical position, the charge can be diminished as desired.

A cap (34) is removably secured over the flared end of the adjustable section in order to admit of access thereto, the cap forming a portion of the wall of the discharge outlet (30). I may also provide a gage (35) of any suitable form to disclose at any time the height of the liquid in the measuring compartment, and the number of charges may be recorded by a counter ($35^a$) operated by the rocking arm (36) which engages with the pin (37) in the rod (26).

By reason of the construction shown, it is evident that the device may be easily and quickly assembled or dismantled, the cover (7), trap (13), stand pipe and valve, being removably seated so that the meter may be easily cleaned or inspected, the partition (4) being removably secured in place for this purpose.

From the foregoing, it is obvious that I have provided a meter which is simple and yet efficient in many arts, and it is further obvious that many changes or alterations might be made in the forms and arrangements of the several parts described or parts omitted without departing from the spirit and scope of my invention, and hence I do not wish to limit myself to the construction herein set forth.

Having thus fully disclosed my invention, what I claim as new and desire to secure, is—

1. A meter comprising a measuring compartment, a reservoir in communication therewith, a movable stand-pipe controlling the communication, an inverted cylinder closed at its upper end and surrounding the stand-pipe, the cylinder being of larger diameter than the stand-pipe and adapted to be liquid-sealed at its lower end, and a grid located between the closed end of the cylinder and the upper open end of the stand pipe to afford a clearance space for the liquid.

2. A meter comprising a measuring compartment, a reservoir having an opening into the compartment, a valve seat in the opening, a movable stand pipe having an opening therein and received on the seat, and a trap supported by and surrounding the stand-pipe and its opening.

3. A meter comprising a measuring compartment having a vent, a reservoir having an opening into the compartment, a valve seat in the opening, a movable stand pipe open at its upper end and received on the valve seat, and a trap open at its lower end, the trap supported by and surrounding the stand pipe, the lower open end of the trap adapted to be liquid sealed.

4. A meter comprising a measuring compartment, a reservoir in communication therewith, a movable stand-pipe having an opening therein and controlling such communication, and a trap supported on and inclosing the stand-pipe and its opening, the trap being liquid sealed at its lower open end.

5. A meter comprising a measuring compartment, means for supplying the compartment with liquid, a discharge pipe, and a bell controlling the access of the contents of the measuring compartment to the discharge pipe, the bell comprising inter-communicating chambers.

6. A meter comprising a measuring compartment, means for supplying liquid thereto, a liquid-sealed discharge pipe projecting into the compartment, and a bell inclosing the projecting end of the discharge pipe, the bell subdivided into a plurality of intercommunicating chambers, the wall between which is of greater length than the outer wall of the bell, and means for limiting the movement of the bell.

7. A meter comprising a measuring compartment, means for supplying liquid thereto, a discharge pipe, one end of which projects into the compartment and a bell inclosing the projecting end of the discharge pipe, the bell subdivided into intercommunicating chambers to permit the entrance of an adequate supply of air to the inner chamber.

8. A meter comprising a measuring compartment, means for supplying liquid thereto, a discharge pipe, one end of which projects into the compartment, and a bell inclosing the projecting end of the discharge pipe, the bell provided with concentric chambers having an aperture affording intercommunication.

9. A meter comprising a measuring compartment, a reservoir, in communication therewith, a combined valve and stand pipe member controlling the communication, a discharge pipe projecting into the compartment, a movable bell inclosing the projecting end of the discharge pipe, a rod carried by the bell and a counting mechanism, the upper end of the rod operating to actuate and guide the combined valve and stand pipe member, and to operate the counting mechanism.

10. A meter comprising a measuring compartment, a reservoir in communication therewith, a combined valve and stand pipe controlling the communication, a submergible bell located in the measuring compartment and a rod carried by the bell, the valve mounted upon and actuated by the rod.

11. A meter comprising a measuring compartment, means for supplying the compartment with liquid, means for emptying the compartment and an adjustable tripping mechanism for determining the charge to be delivered from the compartment.

12. A meter comprising a measuring compartment, a liquid sealed discharge pipe projecting into the compartment, means inclosing the projecting end of the discharge pipe and coöperating therewith to form an air chamber and an adjustable automatically operated tripping means communicating with the air chamber.

13. A meter comprising a measuring compartment, a supply therefor, a liquid-sealed discharge pipe communicating therewith, an air-confining means coöperating with the discharge pipe to form an air space, the increasing head of liquid in the compartment adapted to compress the air confined in the air space and an adjustable liquid-sealed tripping member communicating with the air space and adapted to regulate the charge of liquid admitted to the compartment and to release the air from the air space.

14. A meter comprising a measuring compartment, a liquid supply therefor, a sealed discharge pipe communicating with the compartment, an air confining means coöperating with the discharge pipe to form an air space, a liquid-holding casing communicating with the air space and a liquid-sealed air escape pipe in the casing.

15. A meter comprising a measuring compartment, a liquid supply therefor, a sealed discharge pipe communicating with the compartment, an air-confining means coöperating with the discharge pipe to form an air space, a casing communicating with the air space and consisting of a liquid-holding stem and oppositely projecting branches, a plate isolating the outlet branch from the stem and inlet branch, a sleeve carried by the plate, and an air escape pipe passing through the sleeve, the lower end of the pipe depending into the liquid in the stem and the upper end of the pipe communicating with the outlet branch.

16. A meter comprising a measuring compartment, a liquid supply therefor, a sealed discharge pipe communicating with the compartment, an air-confining means coöperating with the discharge pipe to form an air space, a tripping member communicating with the air space, the tripping member comprising a liquid-holding casing and an air escape pipe, a portion of which depends into the liquid in the casing.

17. A meter comprising a measuring compartment, a liquid supply therefor, a sealed discharge pipe communicating with the compartment, an air-confining means coöperating with the discharge pipe to form an air space, a tripping mechanism communicating with the air space, the mechanism comprising a liquid-holding casing having an inlet and an outlet isolated from each other, and an air escape pipe connecting the inlet and the outlet, the pipe depending into the liquid in the casing.

18. A meter comprising a measuring compartment, a liquid supply therefor, a sealed discharge pipe communicating with the compartment, an air-confining means coöperating with the discharge pipe to form an air space, a tripping mechanism communicating with the air space, the mechanism comprising a liquid-holding casing having an inlet and an outlet isolated from each other, and an air escape pipe connecting the inlet and the outlet, the pipe depending into the liquid in the casing, the upper end of the escape pipe being flared.

19. A meter comprising a measuring compartment, a liquid supply therefor, a sealed discharge pipe communicating with the compartment, an air-confining means coöperating with the discharge pipe to form an air space, a tripping mechanism communicating with the air space, the mechanism comprising a liquid-holding casing having an inlet and an outlet, a sleeve carried by the plate, and a sectional air escape pipe adjustably supported in the sleeve, one end of the pipe communicating with the outlet and the opposite end of the pipe being liquid-sealed.

20. The combination with a meter having an air space formed therein, of a tripping mechanism for releasing the air in the air space, the tripping mechanism comprising a liquid-holding casing, having an inlet communicating with the air space, and an outlet isolated therefrom, and a sectional air escape pipe, one at least of the sections being adjustable relative to the other, one end of the sectional air escape pipe depending beneath the level of the liquid in the casing, the opposite end of the escape pipe communicating with the outlet.

21. The combination with a meter having an air space subjected to pressure, of a tripping mechanism for releasing the air, the mechanism consisting of a sectional air escape pipe, one end of which is liquid sealed, one at least of the sections being adjustable relative to the other.

22. A meter comprising a measuring compartment, a liquid supply therefor, a discharge pipe leading therefrom, an air-confining means controlling the access of the liquid to the discharge pipe and a tripping mechanism communicating with the confined air space, the tripping mechanism comprising an air escape pipe, one end of which is sealed, the confined air operating upon the sealing means to overcome the latter and gain access to the pipe.

23. A tripping mechanism for meters comprising a sectional liquid-sealed pipe, and means for lengthening and shortening the pipe to vary the head of liquid therein.

24. A tripping mechanism for meters comprising a liquid-holding casing, one end of which is in communication with the meter, and an extensible pipe carried by the casing, one end of the pipe being liquid-sealed.

25. A tripping mechanism for meters comprising a casing, one end of which is in communication with the meter, a diaphragm plate extending across the casing, a sleeve carried by the plate, a sectional air escape pipe mounted in the sleeve, one end of the pipe being liquid sealed, the opposite section of the pipe being adjustable in the sleeve and a cap removably carried by the casing for permitting access to the adjustable section of the pipe.

26. A meter comprising a measuring compartment, a reservoir in communication therewith, a valve controlling the communication of liquid to the compartment, a liquid-sealed discharge pipe projecting into the measuring compartment, an air confining means within the measuring compartment, communicating with the admission end of the discharge pipe and controlling the admission of liquid thereinto, means connecting the air confining means and the valve whereby the valve is operated, a liquid sealed tripping member communicating with the interior of the air confining means, and adapted to automatically release the air in the same, and a counting mechanism actuated by the movement of the air confining means.

27. A meter comprising a measuring compartment, a liquid supply therefor, a liquid sealed discharge pipe leading therefrom, an air confining means controlling the access of liquid from the measuring compartment, to the discharge pipe, and a liquid-sealed adjustable tripping member communicating with the interior of the air confining means to permit the confined air to operate upon the sealing liquid to overcome the same and escape from the meter.

28. A meter comprising a measuring compartment, a liquid sealed discharge pipe protruding thereinto, a supply communicating with the measuring compartment, a bell inclosing the protruding portion of the discharge pipe and adapted to move relative thereto, means for controlling the admission of the supply to the measuring tank, said means connected with the bell, and a liquid-sealed tripping mechanism controlling the charge received in the measuring compartment, one end of the tripping mechanism being pivotally secured to the discharge pipe to permit an adjustment of the mechanism to vary the charge.

29. A meter comprising a measuring compartment, a reservoir above the compartment and communicating therewith, a movable apertured valve controlling said communication, a stand-pipe carried by the valve, means in the measuring compartment for actuating the stand-pipe and valve, and an inverted cylinder closed at its upper end except for a vent, the cylinder supported by the stand-pipe, so that a space is left between the upper open end of the stand-pipe and the closed upper end of the cylinder.

30. A meter comprising a measuring compartment, a discharge pipe leading therefrom, means controlling the access of the contents of the compartment to the discharge pipe, and a liquid sealed tripping member connected to and movable in the arc of a circle relative to the discharge pipe for controlling the operation of the first named controlling means.

31. In a meter, the combination of a measuring compartment, a reservoir located above and in communication with the measuring compartment, a skeleton valve controlling the communication, and means open at its upper end and carried by the valve for preventing the passage of liquid through the valve until the level of liquid in the reservoir rises to a sufficient height to overflow into the upper end of such means.

32. A meter comprising a measuring compartment, a reservoir located above and in communication therewith, a skeleton valve controlling such communication, a discharge pipe leading from the measuring compartment, a float in the measuring compartment inclosing the induction end of the discharge pipe, a hollow stand pipe in the reservoir open at its upper end and surrounding the skeleton valve to prevent access of liquid thereto until the level of liquid overflows into the upper end of the stand pipe, means carried by the float and engaging the skeleton valve to raise the same off its seat when the level of liquid escaping into the measuring compartment through the stand pipe and valve has attained a sufficient height to raise the float, and a trip for starting the discharge of liquid from the compartment when a sufficient amount has entered the latter.

33. A meter comprising a measuring compartment, a discharge pipe leading therefrom, a storage chamber, a supply leading thereto, a valve adapted to permit communication between the measuring compartment and the storage chamber, a bell surrounding the receiving end of the discharge pipe and coöperating therewith to form an air chamber, means whereby the bell is adapted to actuate the valve, the bell comprising inter-communicating chambers, and liquid sealed tripping means for permitting the escape of air from the air chamber when a sufficient quantity of liquid has entered the compartment.

34. A meter comprising a measuring compartment, a discharge pipe leading therefrom, a storage chamber, a supply leading thereto, a valve adapted to permit communication between the measuring compartment and the storage chamber, and a bell surrounding the receiving end of the discharge pipe and coöperating therewith to form an air chamber, means whereby the bell is adapted to actuate the valve, the bell comprising inter-communicating chambers, the wall between which is longer than the outer wall of the bell, and liquid sealed tripping means for permitting the escape of air from the air chamber when a sufficient quantity of liquid has entered the compartment.

35. A meter comprising a measuring compartment, a discharge pipe leading therefrom, a storage chamber, a supply leading thereto, a valve adapted to permit communication between the measuring compartment and the storage chamber, a bell surrounding the receiving end of the discharge pipe and coöperating therewith to form an air chamber, means whereby the bell is adapted to actuate the valve, the bell comprising inter-communicating chambers, the wall between which is no longer than the outer wall of the bell, means for preventing a variance in the space intervening between the lower edge of the bell and the bottom of the measuring compartment when the bell is in its lowest position, and liquid sealed tripping means for permitting the escape of air from the air chamber when a sufficient quantity of liquid has entered the compartment.

36. A meter comprising a measuring compartment, a reservoir in communication therewith, a supply for the reservoir, a combined valve and stand pipe controlling the communication, a discharge pipe leading from the compartment, a movable bell inclosing the receiving end of the discharge pipe and adapted to confine air, means connecting the bell and the combined valve and stand pipe whereby movement of the bell actuates the combined valve and stand pipe, and a tripping means for releasing the air confined by the bell.

37. In a meter, the combination with a measuring compartment, and a reservoir in communication therewith, of a movable means controlling the communication, and a vented member inclosing the controlling means for preventing the entrance of any appreciable amount of gas from the reservoir into the compartment.

38. In a meter, the combination with a measuring compartment, and a reservoir in communication therewith, of a combined valve and stand pipe controlling the communication and a vented liquid sealed trap removably mounted on and inclosing the upper open end of the stand pipe for preventing the access of any appreciable amount of gases to the measuring compartment, and permitting the entrance of liquid to the compartment.

39. In a meter, the combination with a measuring compartment, and a reservoir in communication therewith, of a combined skeleton valve and stand pipe, the latter open at its upper end and mounted on the valve for controlling the passage of liquid from the reservoir to the storage compartment, and means carried by the stand pipe for preventing the passage of gases to any appreciable extent through the stand pipe and valve into the measuring compartment and for permitting the escape of gases entrained within the stand pipe by the rising level of liquid in the reservoir and stand pipe.

40. In a liquid measuring device, a measuring compartment; a siphon discharge pipe communicating therewith; a vertically movable float inclosing the upper end of said discharge pipe, a rod secured thereto, and a valve actuated by said rod to shut off the supply of liquid to the measuring compartment; said measuring compartment having a contracted portion adapted to accelerate the rate of rise of liquid near the discharge point and to thereby suddenly prime the siphon discharge pipe.

In testimony whereof I affix my signature, in presence of two witnesses.

FREDERICK N. LOWRY.

Witnesses:
G. L. CAMP,
J. E. LE FEVRE.

Copies of this patent may be obtained for five cents each, by addressing the "Commissioner of Patents, Washington, D. C."